US009631064B2

(12) United States Patent
Wosylus et al.

(10) Patent No.: US 9,631,064 B2
(45) Date of Patent: Apr. 25, 2017

(54) PROCESS FOR PREPARING AN EFFECT PIGMENT

(71) Applicant: BASF SE, Ludwigshafen (DE)

(72) Inventors: Aron Wosylus, Bad Duerkheim (DE); Raimund Schmid, Neustadt (DE)

(73) Assignee: BASF SE, Ludwigshafen (DE)

( * ) Notice: Subject to any disclaimer, the term of this patent is extended or adjusted under 35 U.S.C. 154(b) by 175 days.

(21) Appl. No.: 14/385,932

(22) PCT Filed: Apr. 5, 2013

(86) PCT No.: PCT/EP2013/057229
§ 371 (c)(1),
(2) Date: Sep. 17, 2014

(87) PCT Pub. No.: WO2013/156327
PCT Pub. Date: Oct. 24, 2013

(65) Prior Publication Data
US 2015/0020712 A1    Jan. 22, 2015

Related U.S. Application Data

(60) Provisional application No. 61/635,304, filed on Apr. 19, 2012.

(30) Foreign Application Priority Data

Apr. 19, 2012   (EP) .................................... 12164699

(51) Int. Cl.
C08K 3/08      (2006.01)
C08K 3/36      (2006.01)
C09C 1/00      (2006.01)
C08K 3/22      (2006.01)

(52) U.S. Cl.
CPC .................. C08K 3/36 (2013.01); C08K 3/08 (2013.01); C08K 3/22 (2013.01); C09C 1/0021 (2013.01); C09C 1/0051 (2013.01); C09C 1/0081 (2013.01); C08K 2003/0812 (2013.01); C08K 2003/2275 (2013.01); C09C 2200/1054 (2013.01); C09C 2200/1058 (2013.01); C09C 2200/301 (2013.01); C09C 2200/40 (2013.01); C09C 2200/407 (2013.01)

(58) Field of Classification Search
CPC .. C08K 3/08; C08K 2003/0812; C09C 1/0051
See application file for complete search history.

(56) References Cited

U.S. PATENT DOCUMENTS

| 4,328,042 | A | 5/1982 | Ostertag et al. |
| 5,498,781 | A | 3/1996 | Hall et al. |
| 5,545,677 | A | 8/1996 | Hall et al. |
| 5,552,458 | A | 9/1996 | Hall et al. |
| 5,607,504 | A | 3/1997 | Schmid et al. |
| 5,624,486 | A | 4/1997 | Schmid et al. |
| 6,132,873 | A * | 10/2000 | Dietz ........................ C08K 9/02 106/415 |
| 6,569,529 | B1 * | 5/2003 | Phillips ................. C09C 1/0015 106/403 |
| 6,596,070 | B1 * | 7/2003 | Schmidt ................... A61Q 1/02 106/415 |
| 8,197,591 | B2 | 6/2012 | Kaupp et al. |
| 2003/0209169 | A1 | 11/2003 | Andes et al. |
| 2004/0007159 | A1 | 1/2004 | Katsuta |
| 2007/0104663 | A1 | 5/2007 | Henglein et al. |

FOREIGN PATENT DOCUMENTS

| EP | 0 033 457 | 8/1981 |
| EP | 4 405 492 | 8/1995 |
| EP | 0 688 833 | 12/1995 |
| EP | 0 708 154 | 4/1996 |
| EP | 1 114 103 | 7/2001 |
| EP | 1 338 628 | 8/2003 |
| EP | 1 682 622 | 7/2006 |
| EP | 1 904 587 | 11/2010 |
| JP | 06-016965 | 1/1994 |
| JP | 10114874 | 5/1998 |
| JP | 2004-124069 | 4/2004 |
| WO | 00/09617 | 2/2000 |
| WO | 2005/049739 | 6/2005 |

OTHER PUBLICATIONS

International Search Report issued May 29, 2013, 2012, in PCT/EP13/057229, filed Apr. 5, 2013.
Wang, A. et al., "Evolution of binary $Fe_2O_3/SiO_2$ coating layers on the surfaces of aluminum flakes and the pigmentary performances", Powder Technology., vol. 221, pp. 306-311, XP002680628, 2012.
Du, B. et al., "Research Progress of Coloring Aluminum Pigments by Corrosion Protection Method", Procedia Environmental Sciences., vol. 10, pp. 807-813, XP028343459, 2011.
Office Action issued Oct. 31, 2016 in Japanese Patent Application No. 2015-506172.
Notice of Allowance issued Feb. 6, 2017 in Japanese Patent Application No. 2015-506172.

* cited by examiner

Primary Examiner — Pegah Parvini
(74) Attorney, Agent, or Firm — Oblon, McClelland, Maier & Neustadt, L.L.P.

(57) ABSTRACT

The present invention relates to a process for preparing a coloured effect pigment, comprising the steps of (a) preparing in an aqueous coating medium at least one layer of a hydroxyl-containing metal oxide on a substrate, thereby obtaining in the aqueous coating medium a first coloured pigment material CPM1 comprising the substrate coated with the hydroxyl-containing metal oxide, wherein the substrate is made of aluminium or aluminium alloy which optionally comprises at least one passivating layer, and wherein the hydroxyl-containing metal oxide is a hydroxyl-containing iron oxide or a hydroxyl-containing titanium oxide or a mixture thereof, (b) providing the first coloured pigment material CPM1 in a liquid post-treatment medium comprising one or more high boiling organic liquids, and (c) heating the liquid post-treatment medium to a temperature of at least 90° C. so as to convert the first coloured pigment material CPM1 to a second coloured pigment material CPM2.

20 Claims, No Drawings

PROCESS FOR PREPARING AN EFFECT PIGMENT

Luster or effect pigments are used in many areas, for example in automotive coatings, decorative coatings, plastics pigmentation, paints, printing inks, and cosmetics.

The optical effect is based on the directed reflection of light at predominantly sheet-like, parallel-oriented, metallic or strongly refractive pigment particles. Depending on the composition of the pigment platelets, there are interference, reflection and absorption phenomena which create angular-dependent color and lightness effects.

Metallic effect pigments are all of the platelet-shaped substrates known to the skilled worker, examples being aluminium plates or metal oxide-coated aluminium plates.

Platelet-shaped aluminium pigments having a coating of iron oxide are well known and described e.g. in EP 0 033 457. They belong to the class of effect pigments which, by virtue of their particular color properties, have found wide use in the coloration of coatings, paints, printing inks, plastics, ceramic compositions and glazes and decorative cosmetic preparations.

Iron oxide coated aluminium pigments derive their particular optical profile from a combination of specular reflection at the surface of the aluminium platelet, selective light absorption in the iron oxide layer and light interference at the film-like surfaces of the iron oxide layer. Light interference leads to a color which is mainly determined by the thickness of the iron oxide coating layer. Dry pigment powders therefore exhibit the following hues in air with increasing iron oxide layer thickness which are classified as due to 1st order or 2nd order interference:

1st order interference colors: pale yellow, green-gold, gold, reddish-gold, red, violet, grayish-violet;
2nd order interference colors: yellow, gold, reddish-gold, red-gold, red.

Iron oxide coated aluminium pigments are very bright and opaque, which is why they are widely used in automotive coatings. The pigments customarily used in this field are based on aluminium platelets and exhibit a metallic mirror effect.

Metal oxide layers of effect pigments can be provided on the metallic substrate particles by gas phase decomposition of volatile metal compounds in the presence of oxygen and/or water vapor or by a wet-chemical coating process (e.g. sol-gel process).

EP 0 033 457 A2 describes a process for the preparation of colored effect pigments comprising a metallic substrate whose surface is at least partially covered with an iron oxide, wherein iron pentacarbonyl is oxidized to iron oxide in a fluidized bed of the metallic substrates with oxygen at above 100° C.

In wet-chemical preparation methods, metal oxide containing layers can be applied by hydrolytic reaction of appropriate metal salts, e.g. iron(III) salts such as iron(III) chloride and sulfate, or hydrolysable organometallic compounds.

Details about the preparation of a metal oxide coating layer on a metal-based substrate of an effect pigment are provided e.g. in EP 0 708 154 A2.

Typically, a metal oxide layer prepared via a wet-chemical preparation method may contain a significant number of hydroxyl groups due to incomplete condensation reaction of hydrolysed precursor species or bound water. For coloristic reasons, conversion of the hydroxide-containing layer into the oxide layer during the manufacturing process is preferred so as to avoid any undesired pigment color shift in the applied pigment-containing product. Conversion of the hydroxide-containing layer into the final oxide layer is typically accomplished by drying in a hot gas stream.

However, if the metal substrate of the effect pigment comprises aluminium, such a drying step may trigger an aluminothermic reaction.

Aluminothermic reactions are highly exothermic chemical reactions between aluminium acting as a reducing agent and a metal oxide such as iron oxide or titanium oxide. The most prominent example is the thermite reaction between aluminium and iron oxide. However, aluminium may also react with a titanium oxide or other oxides such as $SiO_2$.

It is an object of the present invention to provide a process for preparing an effect pigment comprising an aluminium-based metal substrate and an iron oxide or titanium oxide layer, said process minimizing the risk of initiating an aluminothermic reaction and being easy to perform but still resulting in an effect pigment having stable coloristic properties (i.e. no or minimal colour shift upon storage or during application of the final pigment-containing product).

According to a first aspect of the present invention, the object is solved by a process for preparing a coloured effect pigment, comprising the steps of (a) preparing in an aqueous coating medium at least one layer of a hydroxyl-containing metal oxide on a substrate, thereby obtaining in the aqueous coating medium a first coloured pigment material CPM1 comprising the substrate coated with the hydroxyl-containing metal oxide, wherein the substrate is made of aluminium or aluminium alloy which optionally comprises at least one passivating layer, and wherein the hydroxyl-containing metal oxide is a hydroxyl-containing iron oxide or a hydroxyl-containing titanium oxide or a mixture thereof, (b) providing the first coloured pigment material CPM1 in a liquid post-treatment medium comprising one or more high boiling organic liquids, and (c) heating the liquid post-treatment medium to a temperature of at least 90° C. so as to convert the first coloured pigment material CPM1 to a second coloured pigment material CPM2.

In the present invention, it has been realized that a coloristically stable aluminium-based effect pigment is obtainable if the metal oxide layer which has been applied onto the aluminium-based substrate (or onto a passivating layer being present on the aluminium-based substrate) by a wet-chemical step and still contains hydroxyl groups, is subjected to a thermal treatment in a high-boiling organic liquid at a temperature of at least 90° C. With the process of the present invention, a thermal drying step and handling of dry pigment powder which may trigger dust explosions can be avoided, thereby also minimizing the risk of an aluminothermic (e.g. thermite) reaction.

With the process of the present invention, effect pigments or luster pigments of different colours can be prepared.

As indicated above, the process of the present invention comprises a step (a) of preparing in an aqueous coating medium at least one layer of a hydroxyl-containing metal oxide on a substrate, thereby obtaining in the aqueous coating medium a first coloured pigment material CPM1 comprising the substrate coated with the hydroxyl-containing metal oxide, wherein the substrate is made of aluminium or aluminium alloy which optionally comprises at least one passivating layer, and wherein the hydroxyl-containing metal oxide is a hydroxyl-containing iron oxide or a hydroxyl-containing titanium oxide and/or a mixture or combination thereof.

As the process of the present invention is for preparing a pigment material, the term "substrate" relates to a particulate substrate, e.g. in the form of flakes or platelets as discussed below in further detail.

The term "hydroxyl-containing metal oxide" indicates that the metal oxide still contains hydroxyl groups due to incomplete condensation during the formation of the metal oxide solid, and/or the metal oxide still contains water. The hydroxyl groups can be distributed over the entire metal oxide, or can be present in some areas of the metal oxide only while the other areas, due to complete condensation, do not contain hydroxyl groups anymore. If not specifically indicated, the term "iron oxide" encompasses any stoichiometric ratio between iron and oxygen that may exist in commonly known iron oxides. The same applies to the term "titanium oxide".

The hydroxyl-containing iron oxide can be selected from a hydrated iron oxide, an iron oxide hydroxide, or any mixture therefrom. The term "hydroxyl-containing iron oxide" also encompasses a mixture of iron oxide such as $Fe_2O_3$ or $Fe_3O_4$ with a hydrated iron oxide and/or an iron oxide hydroxide.

Preferably, Fe atoms are present as Fe(III). However, within the present invention, Fe atoms may also be present as Fe(II) and/or Fe(IV).

The hydrated iron oxide or iron oxide hydroxide can be represented by one of the following formulas:

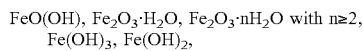
$FeO(OH)$, $Fe_2O_3 \cdot H_2O$, $Fe_2O_3 \cdot nH_2O$ with $n \geq 2$, $Fe(OH)_3$, $Fe(OH)_2$, or can be a mixture of two or more of these hydroxyl-containing iron oxides.

The hydrated iron oxide or iron oxide hydroxide can be crystalline or amorphous, and can be a stoichiometric-type or non-stoichiometric-type oxide.

The hydroxyl-containing titanium oxide can be selected from a hydrated titanium oxide, a titanium oxide hydroxide, or any mixture therefrom. The term "hydroxyl-containing titanium oxide" also encompasses a mixture of titanium dioxide $TiO_2$ with a hydrated titanium oxide and/or a titanium oxide hydroxide Preferably, Ti atoms are present as Ti(IV). However, within the present invention, Ti atoms may also be present as Ti(III).

The hydrated titanium oxide or titanium oxide hydroxide can be represented by one of the following exemplary formulas:

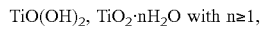
$TiO(OH)_2$, $TiO_2 \cdot nH_2O$ with $n \geq 1$, or can be a mixture of two or more of these hydroxyl-containing titanium oxides.

The hydrated titanium oxide or titanium oxide hydroxide can be crystalline or amorphous, and can be a stoichiometric-type or non-stoichiometric-type oxide.

The step of providing a layer of a hydroxyl-containing iron or titanium oxide on an aluminium-based substrate (either directly on the aluminium and aluminium alloy, respectively, or on a passivating layer which in turn was applied onto the aluminium or aluminium alloy) in an aqueous coating medium is generally known to the skilled person.

A metal oxide layer can be provided by adding an appropriate metal oxide precursor compound such as a metal salt or organometallic compound or other hydrolysable precursor compounds to the aqueous coating medium comprising the aluminium substrate or aluminium alloy substrate which may optionally be coated by at least one passivating layer.

The term "aqueous coating medium" means that the liquid medium contains water in an amount which is sufficient for hydrolyzing the precursor compound and accomplishing condensation of the hydrolyzed species so as to apply a coating on the substrate. Appropriate amounts of water are known to the skilled person or can easily be established by routine experimentation. Typically, the aqueous coating medium contains water in an amount of from 10 wt % to 100 wt %, or from 30 wt % to 100 wt %, or from 50 wt % to 100 wt % based on the total amount of liquids in the aqueous coating medium.

In addition to water, the aqueous coating medium may also contain one or more organic liquids. Appropriate organic liquids are generally known to the skilled person and may include e.g. alcohols, aldehydes, esters, ketones, ethers, alkanes, halide-substituted alkanes, or mixtures thereof. The organic liquid can be a low boiling or high boiling liquid. If present, the high boiling organic liquid can have a boiling point of at least 90° C., more preferably at least 100° C., even more preferably at least 120° C. or at least 140° C.

As indicated above, the substrate is made of aluminium or aluminium alloy, preferably in the form of flakes or platelets. As an exemplary aluminium alloy, aluminium bronze can be mentioned. The aluminium or aluminium alloy platelets or flakes are producible in a simple manner by breaking out of foils or by common atomizing and grinding techniques. Suitable aluminium or aluminium alloy platelets are produced for example by the Hall process by wet grinding in white spirit. The starting material is an atomized, irregular aluminium grit which is ball-milled in white spirit and in the presence of lubricant into platelet-shaped particles and subsequently classified.

Average thickness and average diameter of aluminium or aluminium alloy platelets or flakes can be varied over a broad range. Typically, average thickness of the platelets or flakes can be within the range of 10 nm to 1000 nm, and average diameter can be within the range of 8 µm to 50 µm. Typically, the ratio of average diameter to average thickness can be within the range of 30 to 5000.

Optionally, the aluminium or aluminium alloy is coated with a passivating layer. Appropriate passivating layers are generally known to the skilled person. The passivating layer is preferably an inorganic layer such as a metal phosphate layer, or an inorganic oxide layer. If the inorganic passivating layer is a metal phosphate layer, the metal can be selected from Ti, V, Cr, Mn, Fe, Co, Ni, Cu, Zn, Al, Zr, Nb, Mo, Ta or W. If the inorganic passivating layer is an inorganic oxide layer, the oxide can be selected from Ti, V, Cr, Mn, Fe, Co, Ni, Cu, Zn, Al, Zr, Nb, Mo, Ta, W, Ge, Si, Sn and Bi oxides or any combinations thereof.

Methods for preparing a passivating layer on an effect pigment substrate such as aluminium platelets are generally known to the skilled person.

In principle, a passivating layer can be produced by a wet-chemical method or a chemical vapour deposition (CVD) method.

In the wet-chemical process, appropriate precursor compounds such as organic silicon and/or aluminium compounds in which the organic groups are bonded to the metals via oxygen atoms are hydrolyzed in the presence of the substrate particles (e.g. aluminium flakes or platelets) and of an organic solvent in which the metal compounds are soluble. Preferably, a metal alkoxide (especially tetraethoxysilane and aluminium triisopropoxide) is hydrolyzed in the presence of an alcohol (e.g. ethanol or isopropanol) and a basic or acid catalyst (e.g. aqueous ammonia and/or amines). This is preferably done by initially charging substrate particles, isopropanol, water and ammonia, heating this mixture to from 40° C. to 80° C., with stirring and continuously adding a solution of the metal alkoxide in isopropanol. Following a subsequent stirring time of usually from 1 to 15 h, the mixture is cooled down to room temperature, and the coated pigment is isolated by filtering off, washing and optionally drying. Further details about the method of preparing a passivating layer on aluminium are provided e.g. in EP 0 708 154 A2 and DE 4405492 A.

As will be discussed below in further detail, the preparation of the passivation layer on the aluminium-based pigment substrate may also include a thermal treatment step in a liquid medium containing one or more high boiling organic liquids.

In a preferred embodiment, the substrate on which the hydroxyl-containing metal oxide layer is applied is made of aluminium or aluminium alloy, preferably in the form of flakes or platelets, which comprises at least one passivation layer on its surface.

As mentioned above, a hydroxyl-containing metal oxide layer can be provided on the substrate by using an appropriate precursor compound such as a metal salt or an organometallic compound or other hydrolysable precursor compounds.

Appropriate iron salts include e.g. iron(III) halide salts such as Fe(III) chloride, iron(III) nitrate, iron(III) sulfate, or any combination or mixture of these salts.

Appropriate titanium precursor compounds for forming the metal oxide layer include e.g. titanium tetrachloride, titanium oxychloride, titanium oxysulfate, titanium-organic compounds such as titanium alkoxylates, or any combination or mixture of these compounds.

The addition of the metal oxide precursor compound to the aqueous coating medium is typically continued until the desired colour is achieved (which may depend inter alia from the geometrical layer thickness of the metal oxide coating).

The hydroxyl-containing iron or titanium oxide layer can have a thickness which results in a colour according to 1st order or 2nd order interference series.

If the layer thickness of the hydroxyl-containing iron oxide coating is within a range which results in 1st order interference colours, these colours can be pale yellow, green-gold, gold, reddish-gold, red, violet, or grayish-violet. If the layer thickness of the hydroxyl-containing iron oxide coating is within a range which results in 2nd order interference colours, these colours can be yellow, gold, reddish-gold, red-gold, or red.

The hydroxyl-containing metal oxide layer can be applied onto the substrate at acidic or alkaline pH. Preferably, pH of the aqueous coating medium is kept constant while adding or dosing the metal oxide precursor compound to the aqueous coating medium.

While providing (e.g. by precipitation) the hydroxyl-containing metal oxide layer on the substrate, temperature of the aqueous coating medium can be varied over a broad range, such as room temperature to 100° C., or 30 to 100° C.

Typically, a metal oxide layer (such as an iron oxide or titanium oxide layer) provided on a substrate via a wet-chemical process step still includes a significant number of hydroxyl groups, due to incomplete condensation between the hydrolyzed precursor species and/or the presence of water. If the metal is iron(III), the metal oxide obtained via the wet-chemical method is typically not present in the "fully condensed" oxide form $Fe_2O_3$ but rather in the form of a hydrated iron oxide or iron oxide hydroxide. The iron oxide hydroxide or hydrated iron oxide still contains hydroxyl groups and can be expressed e.g. by the formula FeO(OH).

In process step (a), a first coloured pigment material CPM1 comprising the substrate coated with the hydroxyl-containing metal oxide is obtained in the aqueous coating medium. Preferably, process step (a) does not include any drying step, in particular thermal drying step, which results in a dry or substantially dry first coloured pigment material CPM1. Preferably, there is also no such drying step in between steps (a) and (b). "Substantially dry" preferably means that the liquid content would be less than 5 wt % or even less than 2 wt %.

In a preferred embodiment, an inorganic non-metallic solid is added to the aqueous coating medium containing the first coloured pigment material CPM1. The inorganic non-metallic solid is preferably in particulate or powder form.

The inorganic non-metallic solid can be added to the aqueous coating medium while still preparing the layer of the hydroxyl-containing metal oxide on the substrate, or can be added when the preparation of the hydroxyl-containing metal oxide layer on the substrate (i.e. preparation of the first coloured pigment material CPM1) has been completed.

Inorganic non-metallic solids which are useful for the present invention can be selected from flaky or layered silicates or phyllosilicates, aluminium oxides, aluminosilicates, glass, or any mixture of these. The inorganic non-metallic solid which is added to the aqueous coating medium can be non-coated or coated, e.g. with a metal oxide layer such as an iron oxide or a titanium oxide layer.

A preferred phyllosilicate or sheet or layered silicate is mica. Mica is commonly known to the skilled person and commercially available. In the present invention, synthetic mica as well as naturally occurring mica can be used. Exemplary mica materials that can be mentioned include e.g. phlogopite and fluoro phlogopite.

The average particle size of the inorganic non-metallic solid can be varied over a broad range. Preferable, an average particle size of the inorganic non-metallic solid is chosen which is similar to the average particle size of the first coloured pigment material CPM1. In a preferred embodiment, the average particle size of the inorganic non-metallic solid and the average particle size of the first coloured pigment material CPM1 or the substrate do not differ by more than 30%, more preferably do not differ by more than 15%. In a preferred embodiment, the inorganic non-metallic solid has a plate-like morphology and an aspect ratio which differs by less than 30%, more preferably less than 15% from the aspect ratio of the pigment substrate.

Preferably, the inorganic non-metallic solid is added to the aqueous coating medium in an amount of from 1 wt % to 50 wt %, more preferably from 5 wt % to 30 wt %, based on the amount of the first coloured pigment material CPM1.

While adding the inorganic non-metallic solid, the aqueous coating composition is preferably stirred so as to effectively mix the inorganic non-metallic solid and the first coloured pigment material CPM1.

The presence of the inorganic non-metallic solid assists in suppressing an aluminothermic reaction, in particular if the pigment-containing material is subjected to a drying step at a later stage.

As indicated above, the process of the present invention comprises a step (b) of providing the first coloured pigment material CPM1 in a liquid post-treatment medium comprising one or more high boiling organic liquids, and a step (c)

of heating the liquid post-treatment medium to a temperature of at least 90° C. so as to obtain a second coloured pigment material CPM2.

With the term "post-treatment", it is indicated that said treatment is carried out on a pigment substrate which has already been coated with the hydroxyl-containing metal oxide.

The first coloured pigment material CPM1 can be provided in the liquid post-treatment medium by partially removing the aqueous coating medium, thereby obtaining the first coloured pigment material CPM1 as a wet material, and suspending the wet CPM1 in the liquid post-treatment medium.

The weight ratio of the wet CPM1 (e.g. in the form of a wet filter cake) to the one or more high boiling organic liquids is preferably within the range of from 1/1 to 1/40, or from 1/2 to 1/20.

Preferably, the aqueous coating medium is partially removed by filtration. Thus, the first coloured pigment material CPM1 is obtained in the form of a wet filter cake, which is subsequently suspended in the liquid post-treatment medium.

The wet CPM1 (e.g. in the form of a wet filter cake) can be suspended in the liquid post-treatment medium by means commonly known to the skilled person. The wet CPM1 can be transferred to a vessel containing the liquid post-treatment medium and then suspended therein. Alternatively, the liquid post-treatment medium can be fed to the wet CPM1 and the suspension of the CPM1 in the liquid post-treatment medium may subsequently transferred to another vessel.

Partial removal of the aqueous coating medium can also be accomplished by thermal treatment, possibly in combination with a filtration step.

After partial removal of the aqueous coating medium (e.g. by filtration and/or evaporation), the wet CPM1 (e.g. in the form of a wet filter cake) should still contain said aqueous coating medium in an amount which is sufficient for minimizing the risk of triggering an aluminothermic reaction. Typically, the solids content of the wet CPM1 after partial removal of the aqueous coating medium can be within the range of from 10 wt % to 90 wt %, or from 20 wt % to 80 wt %, or from 30 wt % to 70 wt %.

The first coloured pigment material CPM1 can also be provided in the liquid post-treatment medium by continuously exchanging the aqueous coating medium with the liquid post-treatment medium.

The first coloured pigment material CPM1 can also be provided in the liquid post-treatment medium by using in step (a) an aqueous coating medium which already contains one or more high boiling organic liquids, or adding one or more high boiling organic liquids to the aqueous coating composition during or after the formation of the first coloured pigment material CPM1 in step (a), and subsequently increasing, preferably maximizing, the relative amount of the high boiling organic liquid(s) by thermal treatment, preferably at a temperature of at least 90° C., more preferably at least 100° C., even more preferably at least 120° C. or at least 140° C. Due to this thermal treatment, organic liquids of lower boiling point (if compared to the boiling point(s) of the one or more high boiling liquids) and optionally water are at least partially removed.

As indicated above, the liquid post-treatment medium comprises one or more high boiling organic liquids. Preferably, the high boiling organic liquid has a boiling point of at least 90° C., more preferably at least 100° C., even more preferably at least 120° C. or at least 140° C. In a preferred embodiment, the boiling point of the high boiling organic liquid is within the range of from 90 to 400° C., more preferably from 100 to 300° C., or from 120 to 300° C., or from 140 to 300° C.

Organic liquids having a boiling point within the ranges as described above are known to the skilled person. Preferably, the high boiling organic liquid is selected from alcohols such as monohydroxyl alcohols, diols (e.g. glycols) or polyols, glycol ethers (e.g. diethylene glycol monoethyl ether), polyglycol ethers, polyethylene glycol monoethyl ethers, polypropylene glycols, aldehydes, esters, carbonate esters like propylene carbonate, organic acids, organic acid amides, lactams such as N-methyl pyrrolidone, ketones, ethers, alkanes, halide-substituted alkanes, alkenes, alkynes, liquid polymers, or mineral oils, or mixtures thereof.

Preferably, the liquid post-treatment medium contains the one or more high-boiling organic liquids in an amount of at least 70 wt %, more preferably at least 80 wt % or at least 90 wt %, based on the total weight of the liquid components.

As indicated above, the liquid post-treatment medium is heated to a temperature of at least 90° C., more preferably at least 100° C., even more preferably at least 120° C. or even at least 140° C., so as to obtain a second coloured pigment material CPM2.

Preferably, the liquid post-treatment medium is heated to a temperature of from 90 to 400° C., more preferably from 100 to 300° C., or from 120 to 300° C., or from 140 to 300° C.

At these temperatures, removal of organic liquids of lower boiling point which might still be present, and water (if a heating temperature of at least 100° C. is used) is possible, thereby continuously increasing the content of the high-boiling organic liquids.

If the liquid post-treatment medium contains one or more organic liquids of lower boiling point, e.g. below 90° C. or below 85° C., and optionally water, it can be preferred to continue heating of the liquid post-treatment medium until the organic liquids of lower boiling point and optionally water are at least partially removed from the liquid post-treatment medium.

In a preferred embodiment, the liquid post-treatment medium is heated at a temperature of at least 90° C., more preferably at least 100° C. or at least 120° C. or even at least 140° C., for at least a time period which is sufficient for maximizing the relative amount of the high boiling organic liquid(s), based on the total amount of liquid components, optionally followed by a continued heat treatment at the temperature indicated above for a time period of at least 0.5 h, more preferably at least 3 h.

These temperatures outlined above are sufficiently high so as to decrease the number of hydroxyl groups in the first coloured material CPM1, thereby obtaining a second coloured pigment material CPM2 having a lower content of hydroxyl groups if compared to CPM1, and having improved coloristic stability. Typically, the colour of the second coloured pigment material CPM2 is different from the colour of the first coloured pigment material CPM1, i.e. CPM1 and CPM2 have different light absorption properties.

Within the present invention, it is also possible that the aqueous coating medium already contains one or more of the high-boiling organic liquids described above and may therefore not only act as a coating medium but also as a liquid post-treatment medium. In this specific embodiment, the aqueous coating medium corresponds to the liquid post-treatment medium. According to this preferred embodiment, no specific operations such as filtration and subsequent transfer of the wet filter cake into the liquid post-treatment medium are necessary.

Typically, the heating period of the first coloured pigment material CPM1 in the liquid post-treatment medium can be at least 0.5 h, more preferably at least 3 h and may e.g. range from 0.5 h to 48 h, more preferably from 3 h to 48 h. If the liquid post-treatment medium in which the first coloured pigment material is provided contains one or more organic liquids of lower boiling point, e.g. below 90° C. or below 85° C., and optionally water, it can be preferred to remove the organic liquids and optionally water by heating and then continue heating for the heating period specified above.

Conversion of the first coloured pigment material CPM1 to the second coloured pigment material CPM2 upon heat treatment in the liquid post-treatment medium can also be detected by optical measurements.

If the hydroxyl-containing metal oxide is a hydroxyl-containing iron oxide (e.g. represented by the formula FeO(OH)), a colour shift can be detected in the course of the heat treatment in the liquid post-treatment medium which results from converting FeO(OH) to $Fe_2O_3$. A colour shift can also be detected in the course of converting a titanium oxide hydroxide to $TiO_2$.

Preferably, heating of the liquid post-treatment medium is continued until the desired final colour is obtained, or until no colour shift in the coloured pigment material is detected anymore. In a preferred embodiment, the second coloured pigment material CPM2 obtained in step (c) does not show a colour shift anymore on further heat treatment in the liquid post-treatment medium.

It can be preferred to continue heating of the liquid post-treatment medium in step (c) until at least 95 wt %, more preferably at least 98 wt % or at least 99 wt % of the hydroxyl-containing iron or titanium oxide in CPM1 are converted to the corresponding iron or titanium oxide (i.e. a metal oxide which is fully condensed such as $Fe_2O_3$, $Fe_3O_4$, or $TiO_2$). On the other hand, it can be preferred to continue heating of the liquid post-treatment medium in step (c) to such an extent that hydroxyl groups are still present on the surface of the second coloured pigment material CPM2. Via these surface hydroxyl groups, a surface modification step may then be effected later on.

The liquid post-treatment medium containing the second coloured pigment material CPM2 can be subjected to a filtration step so as to obtain the CPM2 in the form of a wet material (e.g. a wet filter cake). The CPM2 wet filter cake may optionally be subjected to a washing step. Appropriate washing liquids include e.g. polar organic liquids such as $C_{1-4}$ alcohols (e.g. ethanol, isopropanol). Typically, the CPM2 obtained after the final filtration step is a paste.

The solids content of the wet second coloured pigment material CPM2 obtained after the final filtration step (e.g. in the form of a paste) can vary over a broad range. Typically, the wet CPM2 has a solids content of from 10 wt % to 80 wt %, or from 15 wt % to 70 wt %.

The final wet CPM2 may still contain one or more of the high boiling organic liquids described above. The amount of the high boiling organic liquid(s) in the final wet CPM2 depends on whether a washing step has been carried out after the final filtration step.

Accordingly, the liquid component of the wet CPM2 may contain the high boiling organic liquid in an amount of 100 wt % (i.e. no other liquids being present in the wet CPM2) to 0.5 wt %, or from 50 to 0.5 wt %, or from 10 wt % to 0.5 wt %.

As mentioned above, if the liquid post-treatment medium contains one or more organic liquids of lower boiling point, e.g. below 90° C. or below 85° C., and optionally water, it can be preferred to continue heating of the liquid post-treatment medium until the organic liquids of lower boiling point and optionally water are at least partially removed from the liquid post-treatment medium.

Accordingly, it is possible to finally obtain a wet CPM2 which has a very low water-content or is even free of water. This may later-on improve dispersion of the wet CPM2 in organic-based coatings. Preferably, the wet CPM2 obtained from the process of the present invention has a water content of less than 10 wt %, more preferably less than 5 wt % or even less than 2 wt %, based on the total weight of the wet CPM2. The wet CPM2 obtained from the process of the present invention may even be free of water. The water content is determined via Karl-Fischer titration.

Optionally, the process of the present invention may also comprise a step (d) wherein the second coloured pigment material CPM2 is subjected to a surface modification step, e.g. with a surface-modifying agent having a functional group which is reactive to the surface of the CPM2.

Methods for surface modification of effect pigments and appropriate surface modifying agents such as silanes having surface-reactive functional groups (e.g. alkoxysilanes etc.) are known to the skilled person and may improve compatibility of the effect pigment material with the varnish or lacquer. Surface modification methods and agents are described e.g. in EP 1 682 622, EP 1 904 587 and EP 0 688 833.

In a preferred embodiment, surface modification step (d) is carried out in the liquid post-treatment medium, e.g. during and/or subsequent to the heat treatment step (c).

Due to the presence of one or more of the high boiling organic liquids, the surface modification step can be carried out at higher temperature, preferably at least 100° C., more preferably at least 120° C. or at least 140° C. (e.g. 100° C. to 300° C. or 120° C. to 300° C. or 140° C. to 300° C.), which in turn improves covalent attachment of the surface modifying agents to the pigment surface.

For initiating or catalyzing the surface modification of the second coloured pigment material CPM2, it may be preferred that the liquid post-treatment medium in which the surface modification step is carried out contains water. The water may still be present from step (c) or may be added after step (c) but prior to step (d).

If some water is present at the beginning of the surface modification step, it can be preferred to carry out the surface modification step at a temperature of at least 100° C., more preferably at least 120° C. or at least 140° C. for a time which is sufficient to minimize the water content or even remove all water. Low water content upon completion of the surface modification step means that less water molecules are present which may hydrolytically attack the covalent bond between the surface modifying agent and the pigment surface.

As mentioned above, it is preferred that the substrate on which the hydroxyl-containing metal oxide layer is applied is made of aluminium or aluminium alloy, preferably in the form of flakes or platelets, which comprises at least one passivation layer on its surface.

Thus, in a preferred embodiment of the present invention, the process comprises a step (i) which is carried out prior to step (a), wherein
  at least one passivation layer is applied onto the aluminium or aluminium alloy in a liquid passivation medium, thereby obtaining a passivated substrate,
  the passivated substrate is provided in a liquid pre-treatment medium comprising at least one high-boiling organic liquid, and the liquid pre-treatment medium is heated to a temperature of at least 90° C. so as to obtain a pre-treated passivated substrate.

With the term "pre-treatment", it is indicated that said treatment is carried out on a pigment substrate which has not yet been coated with the hydroxyl-containing metal oxide.

Preferably, thermal treatment of the passivated substrate is carried out at a temperature of at least 100° C., more preferably at least 120° C. or at least 140° C.

With regard to appropriate high-boiling organic liquids, reference can be made to those used for the liquid post-treatment medium in steps (b) and (c). Preferably, the high boiling organic liquid is selected from alcohols such as monohydroxyl alcohols, diols (e.g. glycols) or polyols, glycol ethers (e.g. diethylene glycol monoethyl ether), polyglycol ethers, polyethylene glycol monoethyl ethers, polypropylene glycols, aldehydes, esters, carbonate esters like propylene carbonate, organic acids, organic acid amides, lactams such as N-methyl pyrrolidone, ketones, ethers, alkanes, halide-substituted alkanes, alkenes, alkynes, liquid polymers, or mineral oils, or mixtures thereof. Preferably, the high boiling organic liquid has a boiling point of at least 90° C., more preferably at least 100° C., even more preferably at least 120° C. or at least 140° C. In a preferred embodiment, the boiling point of the high boiling organic liquid is within the range of from 90 to 400° C., more preferably from 90 to 300° C., or from 100 to 300° C., or from 120 to 300° C., or from 140 to 300° C.

As mentioned above, methods for preparing a passivating layer on an effect pigment substrate such as aluminium platelets are generally known to the skilled person.

As also discussed above, appropriate passivating layers are generally known to the skilled person. In the present invention, the passivating layer is preferably an inorganic layer such as a metal phosphate layer, and/or an inorganic oxide layer.

The liquid passivation medium preferably contains water in an amount which is sufficient for effecting hydrolysis of appropriate precursor compounds and subsequent condensation of the hydrolyzed precursor species. Preferably, in addition to water, the liquid passivation medium contains an organic liquid such as ethanol and/or iso-propanol which can act as a solvent for the precursor compound to be hydrolyzed. Typically, these organic liquids have a boiling point below 85° C. or even below 80° C.

In step (i), a passivated substrate is prepared in the liquid passivation medium and then provided in the liquid pre-treatment medium. Preferably, process step (i) does not include any drying step, in particular thermal drying step, which results in a dry or substantially dry passivated substrate, or a dry or substantially dry pre-treated passivated substrate. Preferably, there is also no such drying step in between steps (i) and (a). "Substantially dry" preferably means that the liquid content would be less than 5 wt % or even less than 2 wt %.

The passivated substrate can be provided in the liquid pre-treatment medium by partially removing the liquid passivation medium, thereby obtaining the passivated substrate as a wet material, and suspending the wet passivated substrate material in the liquid pre-treatment medium.

Preferably, the liquid pre-treatment medium contains the one or more high-boiling organic liquids in an amount of at least 50 wt %, more preferably at least 60 wt % or at least 70 wt %, or at least 80 wt %.

The weight ratio of the wet passivated substrate material (e.g. in the form of a wet filter cake) to the one or more high boiling organic liquids is preferably within the range of from 1/1 to 1/40, more preferably 1/2 to 1/20.

In a preferred embodiment, the liquid passivation medium is partially removed by filtration. Thus, the passivated substrate is obtained in the form of a wet filter cake, which is subsequently suspended in the liquid pre-treatment medium.

The wet passivated substrate material (e.g. in the form of a wet filter cake) can be suspended in the liquid pre-treatment medium by means commonly known to the skilled person. The wet substrate material can be transferred to a vessel containing the liquid pre-treatment liquid and then suspended therein. Alternatively, the liquid pre-treatment medium can be fed to the wet substrate material and the suspension of the passivated substrate in the liquid pre-treatment medium may subsequently be transferred to another vessel.

Partial removal of the liquid passivation medium can also be accomplished by thermal treatment, possibly in combination with a filtration step.

Typically, the solids content of the wet passivated substrate material after partial removal of the liquid passivation medium can be within the range of from 10 wt % to 90 wt %, or from 20 wt % to 80 wt %, or from 30 wt % to 70 wt %.

The passivated substrate can also be provided in the liquid pre-treatment medium by continuously exchanging the liquid passivation medium with the liquid pre-treatment medium.

The passivated substrate can also be provided in the liquid pre-treatment medium by using a liquid passivation medium which already contains one or more high boiling organic liquids, e.g. in an amount of 50 wt % or more, and/or adding one or more high boiling organic liquids to the liquid passivation medium during or after the formation of the passivated substrate, and subsequently increasing, preferably maximizing, the relative amount of the high boiling organic liquid(s) by thermal treatment, preferably at a temperature of at least 90° C., more preferably at least 100° C., even more preferably at least 120° C. or at least 140° C. Due to this thermal treatment, organic liquids of lower boiling point (if compared to the boiling point(s) of the one or more high boiling liquids) and optionally water are at least partially removed.

As indicated above, the liquid pre-treatment medium is heated to a temperature of at least 90° C., more preferably at least 100° C., even more preferably at least 120° C. or at least 140° C.

At these temperatures, removal of organic liquids of lower boiling point which might still be present, and water (if a heating temperature of at least 100° C. is used) is possible, thereby continuously increasing the content of the high-boiling organic liquids.

Furthermore, these temperatures are sufficiently high so as to initiate further condensation reactions between neighbouring hydroxyl groups.

Within the present invention, it is also possible that the liquid passivation medium already contains one or more of the high-boiling organic liquids described above and may therefore not only act as a passivation medium but also as a liquid pre-treatment medium. In this specific embodiment, the liquid passivation medium corresponds to the liquid pre-treatment medium. According to this preferred embodiment, no specific operations such as filtration and subsequent transfer of the wet filter cake into the liquid pre-treatment medium are necessary.

The pre-treated passivated substrate can be transferred from the liquid pre-treatment medium of step (i) to the aqueous coating medium of step (a) by commonly known means.

The pre-treated passivated substrate can be provided in the aqueous coating medium by partially removing the liquid pre-treatment medium, thereby obtaining the pre-treated passivated substrate as a wet material, and suspending the wet pre-treated passivated substrate material in the aqueous coating medium.

In a preferred embodiment, the liquid pre-treatment medium is partially removed by filtration. Thus, the pre-treated passivated substrate is obtained in the form of a wet filter cake, which is subsequently suspended in the aqueous coating medium.

The wet pre-treated passivated substrate material (e.g. in the form of a wet filter cake) can be suspended in the aqueous coating medium by means commonly known to the skilled person. The wet substrate material can be transferred to a vessel containing the aqueous coating medium and then suspended therein. Alternatively, the aqueous coating medium can be fed to the wet substrate material and the suspension of the pre-treated passivated substrate in the aqueous coating medium may subsequently be transferred to another vessel.

Partial removal of the liquid pre-treatment medium can also be accomplished by thermal treatment, possibly in combination with a filtration step.

Typically, the solids content of the wet pre-treated passivated substrate material after partial removal of the liquid pre-treatment medium can be within the range of from 10 wt % to 90 wt %, or from 20 wt % to 80 wt %, or from 30 wt % to 70 wt %.

The pre-treated passivated substrate can also be provided in the aqueous coating medium by continuously exchanging the liquid pre-treatment medium with the aqueous coating medium.

The present invention also relates to a second coloured pigment material CPM2 which is obtainable or obtained with the process described above.

Preferably, the second coloured pigment material CPM2 obtained with the process of the present invention is a wet material (e.g. in the form of a paste) which contains liquid components. The solids content of the wet second coloured pigment material CPM2 can vary over a broad range. Typically, the wet CPM2 has a solids content of from 10 wt % to 80 wt %, or from 15 wt % to 70 wt %.

Appropriate liquids for providing the CPM2 in the form of a wet material such as a paste are known to the skilled person and can be selected from e.g. polar organic liquids (such a $C_{1-4}$ alcohols) or non-polar organic liquids (such a liquid alkanes, mineral oil etc.). These organic liquids may originate from the final washing step of the CPM2. The final wet CPM2 may still contain one or more of the high boiling organic liquids described above. The amount of the high boiling organic liquid(s) in the final wet CPM2 depends on whether a washing step has been carried out after the final filtration step.

Accordingly, the liquid components of the wet CPM2 may contain the high boiling organic liquid in an amount of 100 wt % (i.e. no other liquids being present in the wet CPM2) to 0.5 wt %, or from 50 wt % to 0.5 wt %, or from 10 to 0.5 wt %.

Preferably, the wet CPM2 has a very low water-content or is even free of water. This may later-on improve dispersion of the wet CPM2 in organic-based coatings. Preferably, the wet CPM2 obtained from the process of the present invention has a water content of less than 10 wt %, more preferably less than 5 wt %, or even less than 2 wt %, based on the total weight of the wet CPM2. The wet CPM2 obtained from the process of the present invention may even be free of water. The water content is determined via Karl-Fischer titration.

In the following Example, the present invention will be discussed in further detail.

EXAMPLES

Example 1

50-200 g aluminium are suspended in 1-3 l ethanol. Following the passivation method described in Example 1 (step a)) of EP 0 708 154, a $SiO_2$ passivation layer is applied on the aluminium. The obtained suspension of passivated aluminium, ethanol and water is subjected to a filtration step. Washing with 0.5-3 l ethanol and a further filtration step follow. An amount of 50-200 g wet filter cake (also including water, ethanol, and non-hydrolyzed/partially hydrolyzed tetraethoxysilane) is suspended in 300-1500 g glycol. The suspension is heated to 150° C. Removal of water and ethanol is achieved. When no further ethanol or water is stripped, stirring at this temperature is continued for 0-24 hours, followed by cooling and filtration. The wet, i.e. glycol-containing filter cake is suspended in 1-3 l water.

The suspension of passivated aluminium in water is heated to 80° C. By adding iron nitrate over a period of about 12 to 48 hours, a hydroxyl-containing iron(III) oxide is applied onto the passivated aluminium. The pH is adjusted to a range of 2.5 to 4 by adding a base (NaOH, $NH_3$, $NaHCO_3$). After having applied the layer of hydroxyl-containing iron(III) oxide having the desired colour, the suspension is cooled, filtered, and washed with water. The water-wet filter cake is suspended in glycol. The suspension of passivated and iron oxide coated aluminium in glycol is heated to 180° C. Due to the heating of the glycol suspension, water is removed and the colour changes from orange to red. The obtained product is an $Al/SiO_2/Fe_2O_3$ effect pigment in a glycol paste.

Example 2

The passivated, silica coated aluminium is prepared as explained in example 1 (i.e. following the passivation method described in Example 1 (step a)) of EP 0 708 154). The resulting aluminium, $SiO_2$, water, ammonia, ethanol and non-hydrolyzed/partially hydrolyzed tetraethoxysilane product is separated by a filtration method and washed two times with Ethanol. 100 g of this filter cake is suspended in 900 ml water and coated with a hydroxyl containing iron oxide layer as explained in Example 1 until the desired color is achieved. The product is separated by filtration and washed with about 10 l water. The resulting water-wet filter cake is suspended in glycol and heat treated at 180° C. up to 12 h. Afterward the product is separated by filtration and washed with isopropanol. Depending on the iron oxide and silica layer thickness, the resulting product is a green, gold, orange or red product paste in isopropanol. Furthermore, depending on how extensively the product is washed with isopropanol, the paste can still contain glycol.

Example 3

The passivated, silica coated aluminium is prepared as explained in example 1. The resulting aluminium, $SiO_2$, water, ammonia, ethanol and non-hydrolyzed/partially hydrolyzed tetraethoxysilane product is separated by a filtration method and washed two times with Ethanol. 100 g of this filter cake is suspended in 900 ml water and coated with a hydroxyl containing iron oxide layer as explained in Example 1 until the desired color is achieved. The product is separated by filtration and washed with about 10 l water. The resulting water-wet filter cake is suspended in diethylene glycol monoethyl ether and heat treated at 180° C. up to 12 h. Afterward the product is separated by filtration and washed with isopropanol. Depending on the iron oxide and silica layer thickness, the resulting product is a green, gold, orange or red product paste in isopropanol. Furthermore, depending on how extensively the product is washed with isopropanol, the paste can still contain diethylene glycol monoethyl ether.

Example 4

The passivated, silica coated Aluminium is prepared as explained in example 1. The resulting aluminium, $SiO_2$, water, ammonia, ethanol and non-hydrolyzed/partially hydrolyzed tetraethoxysilane product is separated by a filtration method and washed two times with ethanol. About 300 g of this ethanol wet filter cake are suspended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing iron oxide layer as explained in Example 1 until the desired color is achieved. The product is separated by filtration and washed with about 10 l water. 23 g resulting water-wet filter cake is suspended in 50 ml diethylene glycol monoethyl ether and heat treated at 190° C. up to 12 h. Afterward the product is separated by filtration and washed with isopropanol. Depending on the iron oxide and silica layer thickness, the resulting product is a green, gold, orange or red product paste in isopropanol. Furthermore, depending on how extensively the product is washed with isopropanol, the paste can still contain diethylene glycol monoethyl ether.

Example 5

The passivated, silica coated aluminium is prepared as explained in example 1. The resulting aluminium, $SiO_2$, water, ammonia, ethanol and non-hydrolyzed/partially hydrolyzed tetraethoxysilane product is separated by a filtration method and washed two times with ethanol. About 300 g of this ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing iron oxide layer as explained in Example 1 until the desired color is achieved. The product is separated by filtration and washed with about 10 l water. 23 g of the resulting water-wet filter cake is suspended in 50 ml triethylene glycol and heat treated at 190° C. or 220° C. or 250° C. up to 12 h. Afterwards the product is separated by filtration and washed with isopropanol. Depending on the iron oxide and silica layer thickness, the resulting product is a green, gold, orange or red product paste in isopropanol. Furthermore, depending on how extensively the product is washed with isopropanol, the paste can still contain triethylene glycol.

Example 6

The passivated, silica coated aluminium is prepared as explained in example 1. The resulting aluminium, $SiO_2$, water, ammonia, ethanol and non-hydrolyzed/partially hydrolyzed tetraethoxysilane product is separated by a filtration method and washed two times with ethanol. About 300 g of this ethanol wet filter cake are suspended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing iron oxide layer as explained in Example 1 until the desired color is achieved. The product is separated by filtration and washed with about 10 l water. 23 g of this paste are suspended in 50 ml propylene carbonate and heat treated at 190° C. up to 12 h. Then, the product is separated by filtration and washed with isopropanol. Depending on the iron oxide and silica layer thickness, the resulting product is a green, gold, orange or red product paste in isopropanol. Furthermore, depending on how extensively the product is washed with isopropanol, the paste can still contain propylene carbonate.

Example 7

The passivated, silica coated Aluminium is prepared as explained in example 1. The resulting aluminium, $SiO_2$, water, ammonia, ethanol and non-hydrolyzed/partially hydrolyzed tetraethoxysilane product is separated by a filtration method and washed two times with ethanol. About 300 g of this ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml polyethylene glycolmonoethylether with a molecular weight of about 350 and heat treated at 190° C. up to 12 h. Afterward the product is separated by filtration and washed with isopropanol. The resulting product is in dependence of the Iron Oxide and Silica layer thickness a green, gold, orange or red product paste in isopropanol. Furthermore, depending on how extensively the product is washed with isopropanol, the paste can still contain polyethylene glycolmonoethylether.

Example 8

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml polyethylene glycolmonoethyl ether with a Molecular weight of about 350 and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain polyethylene glycolmonoethyl ether.

Example 9

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml polyethylene glycolmonoethyl ether with a Molecular weight of about 350 and heat treated at 235° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain polyethylene glycolmonoethyl ether.

Example 10

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml N-methylpyrrolidone and heat treated at 190° C. for 0,5 h, 1 h, 3 h or 12. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain N-methylpyrrolidone.

Example 11

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml butylpolyalkylene glycol copolymers with a Molecular weight of about 840 and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain butylpolyalkylene glycol copolymers.

Example 12

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml with Polypropylene glycols a Molecular weight of about 600 and heat treated at 220° C. for 0,5 h, 1 h 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain polypropylene glycol.

Example 13

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 51 g of this paste are suspended in 35 ml polyethylene glycolmonoethyl ether with a Molecular weight of about 350 and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain polyethylene glycolmonoethyl ether.

Example 14

The passivated, silica coated Aluminium is prepared as explained in example 1 and/or EP 0 708 154. The resulting aluminium, $SiO_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml polyethylene glycolmonoethyl ether with a Molecular weight of about 350 and heat treated at 220° C. for 0,5 h, 1 h, 3 h or 12 h. During this treatment air is bubbled through the suspension. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain polyethylene glycolmonoethyl ether.

Example 15

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml polyethylene glycolmonoethyl ether with a Molecular weight of about 350 and heat treated at 220° C. for 0,5 h, 1 h, 3 h or 12 h. During that treatment Nitrogen is bubbled through the suspension. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain polyethylene glycolmonoethyl ether.

Example 16

The passivated, silica coated Aluminium is prepared as explained in example 1 except that instead of Ethanol as solvent Polyethylenglykolmonoethylether with a Molecular weight of about 350 is used. The resulting aluminium, $SiO_2$, water, Ammonia, ethanol, polyethylene glycolmonoethyl ether with a Molecular weight of about 350 and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating about 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml polyethylene glycolmonoethyl ether with a Molecular weight of about 350 and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain polyethylene glycolmonoethyl ether.

Example 17

The passivated, silica coated Aluminium is prepared as explained in example 1 and/or EP 0 708 154 except that instead of Ethanol as solvent diethylene glycol monoethyl ether is used. The resulting aluminium, $SiO_2$, water, Ammonia, ethanol, diethylene glycol monoethyl ether and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating about 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml polyethylene glycolmonoethyl ether with a Molecular weight of about 350 and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain polyethylene glycolmonoethyl ether.

Example 18

The passivated, silica coated Aluminium is prepared as explained in example 1 except that instead of Ethanol as solvent diethylene glycol monoethyl ether is used. The resulting aluminium, SiO$_2$, water, Ammonia, ethanol, diethylene glycol monoethyl ether and non-hydrolyzed/partially hydrolyzed tetraethoxysilane product is after adding the wanted TEOS amount and 4 h our extra stirring time heated up to 160° C. during that treatment solvents with lower boiling point are stripped off. The suspension is cooled down and separated by a filtration method and washed two times with Ethanol. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 23 g of this paste are suspended in 50 ml polyethylene glycolmonoethyl ether with a Molecular weight of about 350 and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain polyethylene glycolmonoethyl ether.

Example 19

The passivated, silica coated Aluminium is prepared as explained in example 1. The resulting aluminium, SiO$_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 100 g of this paste are suspended in 250 ml Isoparaffin fluid and heat treated at 190° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain isoparaffin.

Example 20

The passivated, silica coated Aluminium is prepared as explained in example 1. The resulting aluminium, SiO$_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 100 g of this paste are suspended in 250 ml Isoparaffin fluid and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain isoparaffin.

Example 21

The passivated, silica coated Aluminium is prepared as explained in example 1 and/or EP 0 708 154. The resulting aluminium, SiO$_2$, water, Ammonia, ethanol and non-hydrolyzed/partially hydrolyzed tetraethoxysilane product is separated by a filtration method and washed two times with Ethanol. About 300 g of this Ethanol wet filter cake are supended in 1 l diethylene glycol monoethyl ether and heated to 157° C. During heating 285 ml of solvents with lower boiling point are stripped off. After 16 h at 157° C. the product is cooled down and separated by filtration methods. 100 g of this diethylene glycol monoethyl ether wet filter cake is suspended in 900 ml water and coated with a hydroxyl containing Iron oxide layer as explained in Example 1 until the desired color is achieved. The product is separated by filtration and washed with about 10 l water. 100 g of this paste are suspended in 250 ml Isoparaffin fluid and heat treated at 250° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain isoparaffin.

Example 22

The passivated, silica coated Aluminium is prepared as explained in example 1. The resulting aluminium, SiO$_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water. 100 g of this paste are suspended in 250 ml Isoparaffin fluid and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain isoparaffin.

Example 23

The passivated, silica coated Aluminium is prepared as explained in example 1. The resulting aluminium, SiO$_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 100 g of this paste are suspended in 250 ml Isoparaffin fluid and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain isoparaffin.

Example 24

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 100 g of this paste are suspended in 250 ml polyethylene glycolmonoethyl ether with a molecular weight of 350 and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain polyethylene glycolmonoethyl ether.

Example 25

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 100 g of this paste are suspended in 800 ml Isoparaffin fluid and heat treated at 220° C. for 0,5 h, 1 h, 3 h or 12 h. Afterward the product is separated by filtration and washed with Isopropanol. The resulting product is in dependence of the Iron Oxide and Silica layer thickness a green, gold, orange or red product paste in isopropanol. Furthermore, depending on how extensively the product is washed with isopropanol, the paste can still contain isoparaffin.

Example 26

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 100 g of this paste are suspended in 800 ml Isoparaffin fluid and heat treated at 220° C. for 0,5 h, 1 h, 3 h or 12 h. Afterward the product is separated by filtration and washed with Isopropanol. 46 g of this paste are suspended in 100 ml of Isopropanol and heated to 70° C. At this temperature 1 g 3-Aminopropyltrimethoxysilane, 1 g Water and 2 g Triethanolamine are added. The suspension is stirred 6 h at 70° C. before cooling and separation of the product by filtration. The filter cake is washed with 50 ml Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain isoparaffin.

Example 27

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 100 g of this paste are suspended in 800 ml Isoparaffin fluid and heat treated at 220° C. for 0,5 h, 1 h, 3 h or 12 h. Afterward the product is separated by filtration and washed with Isopropanol. 46 g of this paste are suspended in 100 ml of Isopropanol and heated to 70° C. At this temperature 1 g (3-glycidoxypropyl)trimethoxysilane, 1 g Water and 2 g Triethanolamine are added. The suspension is stirred 6 h at 70° C. before cooling and separation of the product by filtration. The filter cake is washed with 50 ml Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain isoparaffin.

Example 28

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 100 g of this paste are suspended in 800 ml Isoparaffin fluid and heat treated at 220° C. for 0,5 h, 1 h, 3 h or 12 h. Afterward the product is separated by filtration and washed with Isopropanol. 46 g of this paste are suspended in 100 ml of Isopropanol and heated to 70° C. At this temperature 1 g (3-glycidoxypropyl)trimethoxysilane, 1 g 3-Aminopropyltrimethoxysilane, 1 g Water and 2 g Triethanolamine are added. The suspension is stirred 6 h at 70° C. before cooling and separation of the product by filtration. The filter cake is washed with 50 ml Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain isoparaffin.

Example 29

The passivated, silica coated Aluminium is prepared as explained in example 1 and/or EP 0 708 154. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 100 g of this paste are suspended in 800 ml Isoparaffin fluid and heat treated at 220° C. for 0,5 h, 1 h, 3 h or 12 h. Afterward the product is separated by filtration and washed with Isopropanol. 46 g of this paste are suspended in 100 ml of Isopropanol and heated to 70° C. At this temperature 2 g 3-Aminopropyltrimethoxysilane, 2 g Water and 4 g Triethanolamine are added. The suspension is stirred 6 h at 70° C. before cooling and separation of the product by filtration. The filter cake is washed with 50 ml Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain isoparaffin.

Example 30

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 46 g of this paste are suspended in 110 ml Isoparaffin fluid and heat treated at 220° C. for 3 h -12 h. During heating about 13 ml of low boiling liquids are separated. Afterwards the product is cooled to 70° C. At this temperature 2 g 3-Aminopropyltrimethoxysilane, 2 g Water and 4 g Triethanolamine are added and the suspension is stirred at that temperature for 6 h before cooling down to room temperature. The product is separated by filtration and washed three times with 20 ml of Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain isoparaffin.

Example 31

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 46 g of this paste are suspended in 110 ml Isoparaffin fluid and heat treated at 220° C. for 3 h. During heating about 13 ml of low boiling liquids are separated. Afterwards the product is cooled to 70° C. At this temperature 2 g (3-glycidoxypropyl)trimethoxysilane, 2 g Water and 4 g Triethanolamine are added and the suspension is stirred at that temperature for 6 h before cooling down to room temperature. The product is separated by filtration and washed three times with 20 ml of Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain isoparaffin.

Example 32

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 46 g of this paste are suspended in 110 ml Isoparaffin fluid and heat treated at 220° C. for 3 h. During heating about 13 ml of low boiling liquids are separated. Afterwards the product is cooled to 70° C. At this temperature 2 g 3-Aminopropyltrimethoxysilane, 2 g Water mixed with 50 ml Isopropanol and 4 g Triethanolamine are added and the suspension is stirred at that temperature for 6 h before cooling down to room temperature. The product is separated by filtration and washed three times with 20 ml of Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain isoparaffin.

Example 33

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 46 g of this paste are suspended in 110 ml polyethylene glycolmonoethyl ether with a Molecular Weight of 350 and heat treated at 220° C. for 3 h-12 h. During heating about 12 ml of low boiling liquids are separated. Afterwards the product is cooled to 70° C. At this temperature 2 g 3-Aminopropyltrimethoxysilane, 2 g Water and 4 g Triethanolamine are added and the suspension is stirred at that temperature for 6 h before cooling down to room temperature. The product is separated by filtration and washed three times with 20 ml of Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain polyethylene glycolmonoethyl ether.

Example 34

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 46 g of this paste are suspended in 110 ml polyethylene glycolmonoethyl ether with a Molecular Weight of 350 and heat treated at 220° C. for 3 h-12 h. During heating about 12 ml of low boiling liquids are separated. Afterwards the product is cooled to 70° C. At this temperature 2 g (3-glycidoxypropyl)trimethoxysilane, 2 g Water and 4 g Triethanolamine are added and the suspension is stirred at that temperature for 6 h before cooling down to room temperature. The product is separated by filtration and washed three times with 20 ml of Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain polyethylene glycolmonoethyl ether.

Example 35

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 46 g of this paste are suspended in 110 ml Isoparaffin fluid and heat treated at 220° C. for 3h-12 h. During heating about 13 ml of low boiling liquids are separated. Afterwards the product is cooled to 70° C. At this temperature 2 g 3-Aminopropyltrimethoxysilane, 2 g Water mixed with 50 ml Isopropanol and 4 g. Triethanolamine are added and the suspension is stirred at that temperature for 6 h before heating to 150° C. At 150° C. the product is stirred for 10 h before cooling down to room temperature. The product is separated by filtration and washed three times with 20 ml of Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain isoparaffin.

Example 36

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 46 g of this paste are suspended in 110 ml Isoparaffin fluid and heat treated at 220° C. for 3 h. During heating about 13 ml of low boiling liquids are separated. Afterwards the product is cooled to 70° C. At this temperature 2g 3-(3-glycidoxypropyl)trimethoxysilane, 2 g Water mixed with 50 ml Isopropanol and 4 g Triethanolamine are added and the suspension is stirred at that temperature for 6 h before heating to 150° C. At 150° C. the product is stirred for 10 h before cooling down to room temperature. The product is separated by filtration and washed three times with 20 ml of Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain isoparaffin.

Example 37

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Iron oxide layer as explained in Example 1 until the desired color is achieved. The product is separated by filtration and washed with about 10 l water first followed by washing two times with 1 l Isopropanol. 46 g of this paste are suspended in 110 ml polyethylene glycolmonoethyl ether with a molecular weight of 350 and heat treated at 220° C. for 3 h. During heating 13 ml of low boiling liquids are separated. Afterwards the product is cooled to 70° C. At this temperature 2 g 3-Aminopropyltrimethoxysilane, 2 g Water mixed with 50 ml Isopropanol and 4 g Triethanolamine are added and the suspension is stirred at that temperature for 6 h before heating to 150° C. At 150° C. the product is stirred for 10 h before cooling down to room temperature. The product is separated by filtration and washed three times with 20 ml of Isopropanol. The resulting product is in dependence of the Iron Oxide and Silica layer thickness a green, gold, orange or red surface treated product paste in isopropanol. Furthermore, depending on how extensively the product is washed with isopropanol, the paste can still contain polyethylene glycolmonoethyl ether.

Example 38

50-200 g aluminium are suspended in 1-3 l ethanol. Following the passivation method described in Example 1 (step a)) of EP 0 708 154, a $SiO_2$ passivation layer is applied on the aluminium. The obtained suspension of passivated aluminium, ethanol and water is subjected to a filtration step. Washing with 0.5-3 l ethanol and a further filtration step follow. An amount of 50-200 g wet filter cake (also including water, ethanol, and non-hydrolyzed/partially hydrolyzed tetraethoxysilane) is suspended in 300-1500 g glycol. The suspension is heated to 150° C. Removal of water and ethanol is achieved. When no further ethanol or water is stripped, stirring at this temperature is continued for 0-24 hours, followed by cooling and filtration. The wet, i.e. glycol containing filter cake is suspended in 1-3 l water.

The suspension of passivated aluminium in water is heated to about 80° C. By adding Titan-oxy-chloride solution over a period of about 12 to 48 hours a partially hydroxyl containing $TiO_2$ layer is applied. The pH is adjusted during Titan-oxy-chloride addition to a range of 1.5 to 4 by adding a base (NaOH, NH3, $NaHCO_3$). After having applied the layer of hydroxyl containing Ti(IV) oxide and reaching the desired colour, the suspension is cooled, filtered, and washed with water and isopropanol. The water/isopropanol-wet filter cake is suspended in glycol and heated to 180° C. Due to the heating of the glycol suspension, water and isopropanol is removed. The obtained product is a colored $Al/SiO_2/TiO2$ effect pigment in a glycol paste.

Example 39

The passivated, silica coated Aluminium is prepared as explained in example 1. The resulting aluminium, $SiO_2$, water, Ammonia, ethanol and non-hydrolyzed/partially hydrolyzed tetraethoxysilane product is separated by a filtration method and washed two times with Ethanol. 100 g of this ethanol wet filter cake is suspended in 900 ml water and coated with a hydroxyl containing Titanium oxide layer as explained in Example 38 until the desired color is achieved. The product is separated by filtration and washed with about 10 l water first followed by washing two times with 1 l Isopropanol. 100 g of this paste are suspended in 800 ml Isoparaffin fluid and heat treated at 220° C. for 0,5 h, 1 h or 3 h. Afterward the product is separated by filtration and washed with Isopropanol. The obtained product is a colored $Al/SiO_2/TiO2$ effect pigment in an isopropanol paste. Furthermore, depending on how extensively the product is washed with isopropanol, the paste can still contain isoparaffin.

The invention claimed is:

1. A process for preparing a coloured effect pigment, the process comprising
    (a) preparing in an aqueous coating medium at least one layer of a hydroxyl-containing metal oxide on a substrate, thereby obtaining in the aqueous coating medium a first coloured pigment material CPM1 comprising the substrate coated with the hydroxyl-containing metal oxide, wherein the substrate is made of aluminium or aluminium alloy which optionally comprises a passivating layer, and wherein the hydroxyl-containing metal oxide is a hydroxyl-containing iron oxide or a hydroxyl-containing titanium oxide and/or a mixture thereof,
    (b) providing the first coloured pigment material CPM1 in a liquid post-treatment medium comprising a high boiling organic liquid, and
    (c) heating the liquid post-treatment medium to a temperature of at least 90° C. so as to convert the first coloured pigment material CPM1 to a second coloured pigment material CPM2.

2. The process according to claim 1, wherein the passivating layer is a metal phosphate layer and/or an inorganic oxide layer.

3. The process according to claim 1, wherein the hydroxyl-containing iron or titanium oxide layer has a thickness which results in a colour according to $1^{st}$ order or $2^{nd}$ order interference series.

4. The process according to claim 1, wherein
    an inorganic non-metallic solid is added to the aqueous coating medium containing the first coloured pigment material CPM1, and
    the inorganic non-metallic solid optionally is sheet or layered silicates, aluminium oxides, aluminosilicates, glass, or any combination thereof.

5. The process according to claim 1, wherein the first coloured pigment material CPM1 is provided in the liquid post-treatment medium by partially removing the aqueous coating medium, thereby obtaining the first coloured pigment material CPM1 as a wet material, and suspending the wet CPM1 in the liquid post-treatment medium.

6. The process according to claim 5, wherein the aqueous coating medium is partially removed by filtration and/or thermal treatment.

7. The process according to claim 1, wherein the first coloured pigment material CPM1 is provided in the liquid post-treatment medium by
    using in said preparing (a) an aqueous coating medium which already contains one or more high boiling organic liquids, and/or adding one or more high boiling organic liquids to the aqueous coating medium during or after formation of the first coloured pigment material CPM1 in said preparing (a), and
    subsequently increasing, optionally maximizing, an amount of the one or more high boiling organic liquids, relative to a total amount of liquid components, by thermal treatment.

8. The process according to claim 1, wherein
    the high boiling organic liquid has a boiling point of at least 90° C., and
    the high boiling organic liquid is optionally selected from the group consisting of an alcohol, a glycol ether, a polyglycol ether, an aldehyde, an ester, an organic acid, a ketone, an ether, an alkane, a halide-substituted alkane, an alkene, an alkane, a liquid polymer, a mineral oil, or an mixture thereof.

9. The process according to claim 1, wherein the liquid post-treatment medium comprises the high-boiling organic liquid in an amount of at least 70 wt %.

10. The process according to claim 1, wherein the liquid post-treatment medium is heated in said heating (c) for at least 0.5 h.

11. The process according to claim 1, wherein the liquid post-treatment medium is heated in said heating (c) at least for a time period which is sufficient for maximizing an amount of the high boiling organic liquid, relative to a total amount of liquid components.

12. The process according to claim 1, further comprising
    (d) carrying out a surface modification of the second coloured pigment material CPM2 in the liquid post-treatment medium.

13. The process according to claim 1, wherein, prior to step said preparing (a),
    the passivating layer is applied onto the aluminium or aluminium alloy in a liquid passivation medium, thereby obtaining a passivated substrate,
    the passivated substrate is provided in a liquid pre-treatment medium comprising a high-boiling organic liquid, and
    the liquid pre-treatment medium is heated to a temperature of at least 90° C. so as to obtain a pre-treated passivated substrate.

14. The process according to claim 13, wherein the passivated substrate is provided in the liquid pre-treatment medium by partially removing the liquid passivation medium, optionally by filtration and/or thermal treatment, thereby obtaining the passivated substrate as a wet material, and suspending the wet substrate material in the liquid pre-treatment medium.

15. The process according to claim 13, wherein the passivated substrate is provided in the liquid pre-treatment medium by using a liquid passivation medium which already contains one or more high boiling organic liquids, and/or adding one or more high boiling organic liquids to the liquid passivation medium during or after formation of the passivated substrate, and subsequently increasing, optionally maximizing, a relative amount of the one or more high boiling organic liquids by thermal treatment.

16. The process according to claim 1, wherein the process does not include any drying operations which result in a dry or substantially dry first coloured pigment material CPM1.

17. A wet second coloured pigment material CPM2 obtained by the process according to claim 1.

18. The wet second coloured pigment material CPM2 according to claim 17, having a solids content of from 10 wt % to 80 wt %.

19. The wet second coloured pigment material CPM2 according to claim 17, having a water content of less than 10 wt %.

20. The wet second coloured pigment material CPM2 according to claim 17, comprising a high boiling organic liquid, which has a boiling point of at least 90° C.

* * * * *